United States Patent [19]

Lockhart et al.

[11] Patent Number: 4,724,723

[45] Date of Patent: Feb. 16, 1988

[54] CLOSED LOOP SHIFT QUALITY CONTROL SYSTEM

[75] Inventors: Bruce D. Lockhart, Rochester Hills; Dean E. McCulloch, Washington, both of Mich.

[73] Assignee: General Motors Corporation, Detroit, Mich.

[21] Appl. No.: 937,890

[22] Filed: Dec. 4, 1986

Related U.S. Application Data

[63] Continuation-in-part of Ser. No. 890,659, Jul. 30, 1986, abandoned.

[51] Int. Cl.⁴ .................... B60K 41/06; B60K 41/18
[52] U.S. Cl. .................................. 74/854; 74/851; 74/857; 74/858
[58] Field of Search .................. 74/851, 854, 856, 857, 74/858, 859

[56] References Cited

U.S. PATENT DOCUMENTS

| | | | |
|---|---|---|---|
| 3,712,156 | 1/1973 | Kuhnle | 74/858 |
| 3,792,630 | 2/1974 | Hause | 74/851 X |
| 3,886,818 | 6/1975 | Wurst | 74/851 X |
| 4,246,805 | 1/1981 | Umezawa | 74/851 |
| 4,355,550 | 10/1982 | Will et al. | 74/872 |
| 4,389,910 | 6/1983 | Lockhart | 74/843 |
| 4,403,527 | 9/1983 | Mohl et al. | 74/858 X |
| 4,467,673 | 8/1984 | Hamada et al. | 74/859 X |
| 4,488,455 | 12/1984 | Shetler et al. | 74/851 |
| 4,520,694 | 6/1985 | Eschrich et al. | 74/858 |
| 4,527,678 | 7/1985 | Pierre et al. | 192/3.58 |
| 4,541,052 | 9/1985 | McCulloch | 364/431.07 |

FOREIGN PATENT DOCUMENTS

| | | | |
|---|---|---|---|
| 2941556 | 4/1981 | Fed. Rep. of Germany | 74/851 |
| 0207556 | 12/1983 | Japan | 74/851 |
| 2151727 | 7/1985 | United Kingdom | 74/858 |

*Primary Examiner*—Leslie Braun
*Assistant Examiner*—Dwight G. Diehl
*Attorney, Agent, or Firm*—Mark A. Navarre

[57] ABSTRACT

The output power of an automotive powertrain including a throttled engine and a stepped ratio transmission is maintained substantially constant during upshifting of the transmission. The powertrain output torque is actively measured during shifting, and the output power of the powertrain is controlled by modulation of the engine throttle position and spark timing, and the transmission clutch apply pressures.

5 Claims, 16 Drawing Figures

|   | DRIVE 3 CLUTCH 84 | 4TH CLUTCH 82 | FORWARD CLUTCH 88 | 3RD CLUTCH 90 | 1ST/REV CLUTCH 116 | 2ND BAND 118 |
|---|---|---|---|---|---|---|
| 1 | ON | OFF | ON | OFF | ON | OFF |
| 2 | ON | OFF | ON | OFF | OFF | ON |
| 3 | ON | OFF | ON | ON | OFF | OFF |
| 4 | OFF | ON | ON | ON | OFF | OFF |
| R | ON | OFF | OFF | ON | ON | OFF |

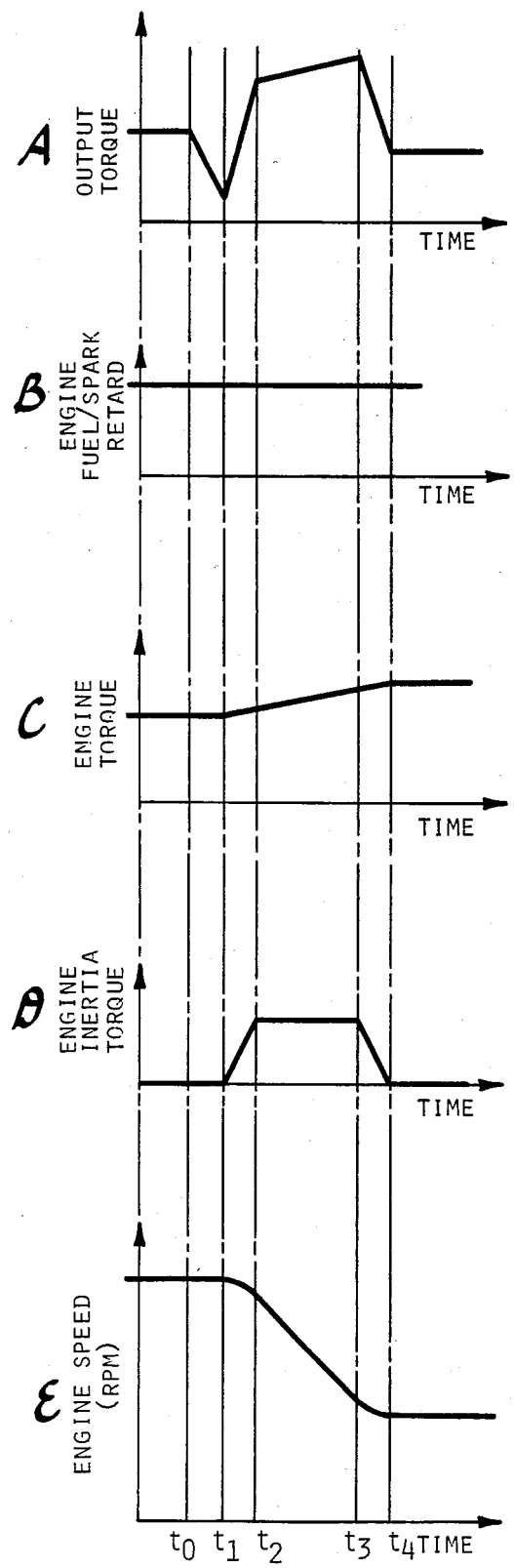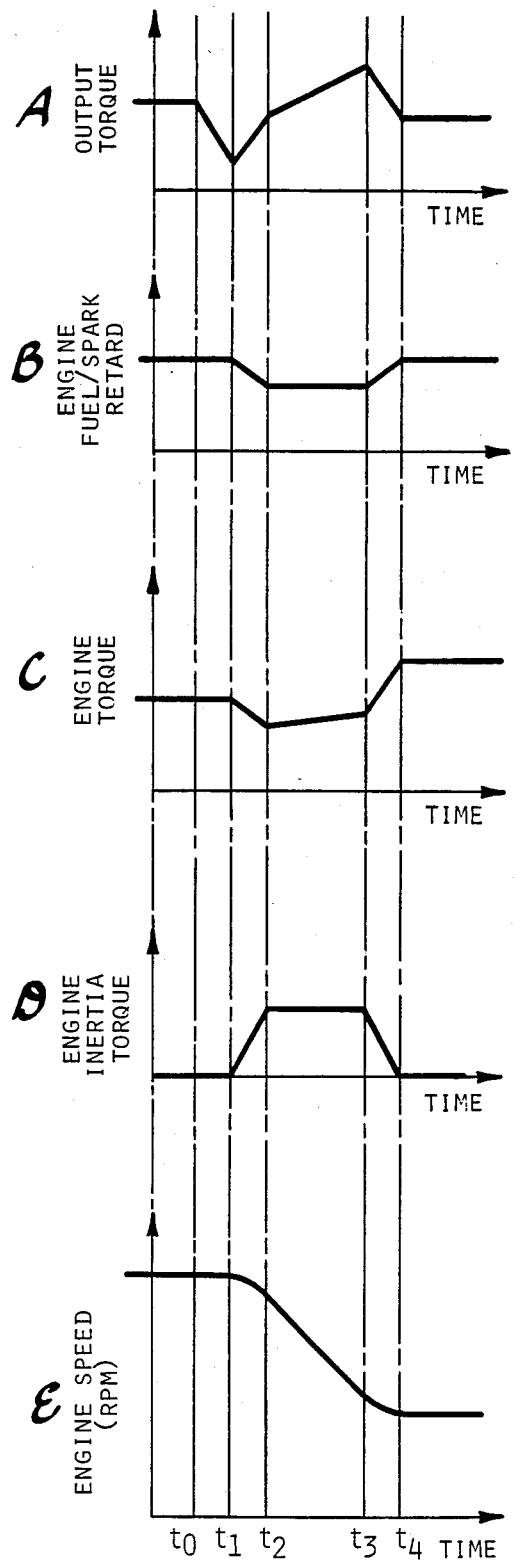
Fig. 3 PRIOR ART
Fig. 4 PRIOR ART

CLOSED LOOP SHIFT QUALITY CONTROL SYSTEM

This is a continuation-in-part of U.S. Ser. No. 890,659, filed on July 30, 1986, now abandoned.

This invention relates to an integrated control system for a vehicle powertrain including an engine and a stepped speed ratio automatic transmission, and more particularly to a system in which the engine output torque is controlled during upshifting of the transmission such that the powertrain output power is maintained substantially constant.

An integrated powertrain control system for a motor vehicle regulates the operation of both the engine and transmission in a cooperative manner to improve the overall efficiency and/or drivability of the vehicle. Such controls are typically driven by operator demand and include linkageless or drive-by-wire control of engine power output and transmission shifting. See, for example, U.S. Pat. No. 4,389,910, to Lockhart issued June 28, 1983 and assigned to the assignee of the present invention, where the throttle of an internal combustion engine is positioned by an electric stepper motor, and transmission shifting is initiated by adjustment of a fluid pressure mechanism internal to the transmission.

The powertrain according to this invention includes a throttled internal combustion engine, and a stepped multiple ratio automatic transmission. The transmission includes a number of gear elements coupling its input and output shafts, and a similar number of torque establishing devices such as clutches and brakes. The brakes can be of the band type or disk type; engineering personnel in the automotive art refer to disk type brakes in transmissions as "clutches" or "reaction clutches." The various gear elements define a number of discrete ratios (steps) between the transmission input and output shafts, and the torque establishing devices are selectively and individually engageable to establish a desired ratio.

Normally, upshifting from one forward gear ratio to another involves a decrease in the torque advantage of the transmission (output torque/input torque)—also referred to as the torque ratio—and an increase in the speed advantage (output speed/input speed)—also referred to as the speed ratio. The shift is typically performed with engine output torque applied, and may involve substantial variation in the transmission output torque.

When the shift is initiated by concurrently releasing the clutch (off-going) associated with the current gear ratio and applying the clutch (on-coming) associated with the desired gear ratio, the output torque drops in accordance with the change in torque ratio. This portion of the shift is referred to as the torque phase, and occurs without an accompanying change in engine speed. Thereafter, an inertia phase occurs, during which the output torque increases above the post-shift level as the on-coming clutch accelerates the engine inertia to its target speed. When the engine speed reaches its target speed, the output torque drops to the post-shift level, completing the shift. Such shift-related output torque variation occurs to a greater or lesser extent in every shift, and adversely affects the drivability of the vehicle, especially under conditions requiring frequent shifting.

The object of this invention is to provide an improved integrated powertrain control system including a shiftable ratio transmission, wherein the engine and transmission are controlled during upshifting of the transmission to maintain the powertrain output power substantially constant. The powertrain output torque is actively measured during shifting, and the transmission output power (torque × speed) is controlled by modulation of the engine throttle opening and spark timing, and the transmission on-coming and off-going clutch apply pressures. Off-going clutch control is not required where overrunning or one-way clutches are used.

In the torque phase of an upshift, the engine throttle and spark timing are controlled to increase the transmission output torque in the amount of the reduction which would occur due to the change in torque ratio. Initially the throttle setting is increased and the spark timing is retarded. The on-coming and off-going clutches are progressively applied and released to initiate the torque phase, and the spark timing is progressively advanced to effect a progressive and controlled increase in engine output torque that offsets the change in torque ratio. The spark timing is fully advanced by the time the torque ratio reaches its target value, and the increased throttle setting fully offsets the reduction in torque ratio.

In the inertia phase of the upshift, the throttle is returned to the setting chosen by the operator of the vehicle, and the spark timing is retarded in relation to the percent of speed ratio remaining in the shift. The off-going clutch is fully released, and the on-coming clutch is engaged in a closed loop manner so as to maintain the transmission output power substantially constant. The spark timing is fully advanced and the on-coming clutch fully applied by the time the speed ratio reaches its target value, completing the shift.

In the Drawings

FIGS. 3–4 graphically depict various engine and transmission parameters during a transmission upshift. FIG. 3 depicts the operation of a conventionally controlled transmission; FIG. 4 depicts the operation of a transmission having an engine torque reduction control.

Figure 5:
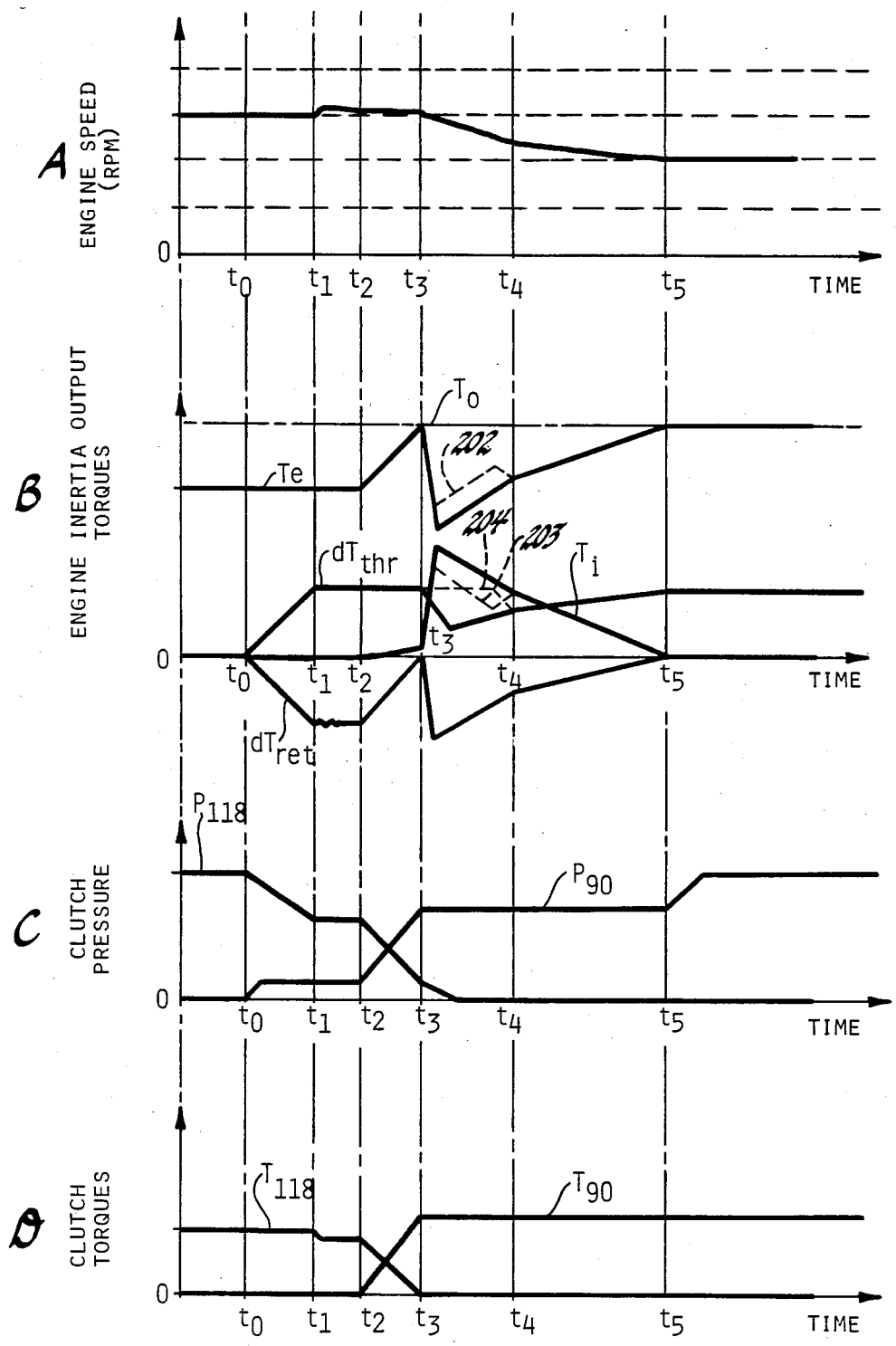

FIG. 5 graphically depicts various powertrain control parameters during a transmission upshift according to this invention.

Figure 1:
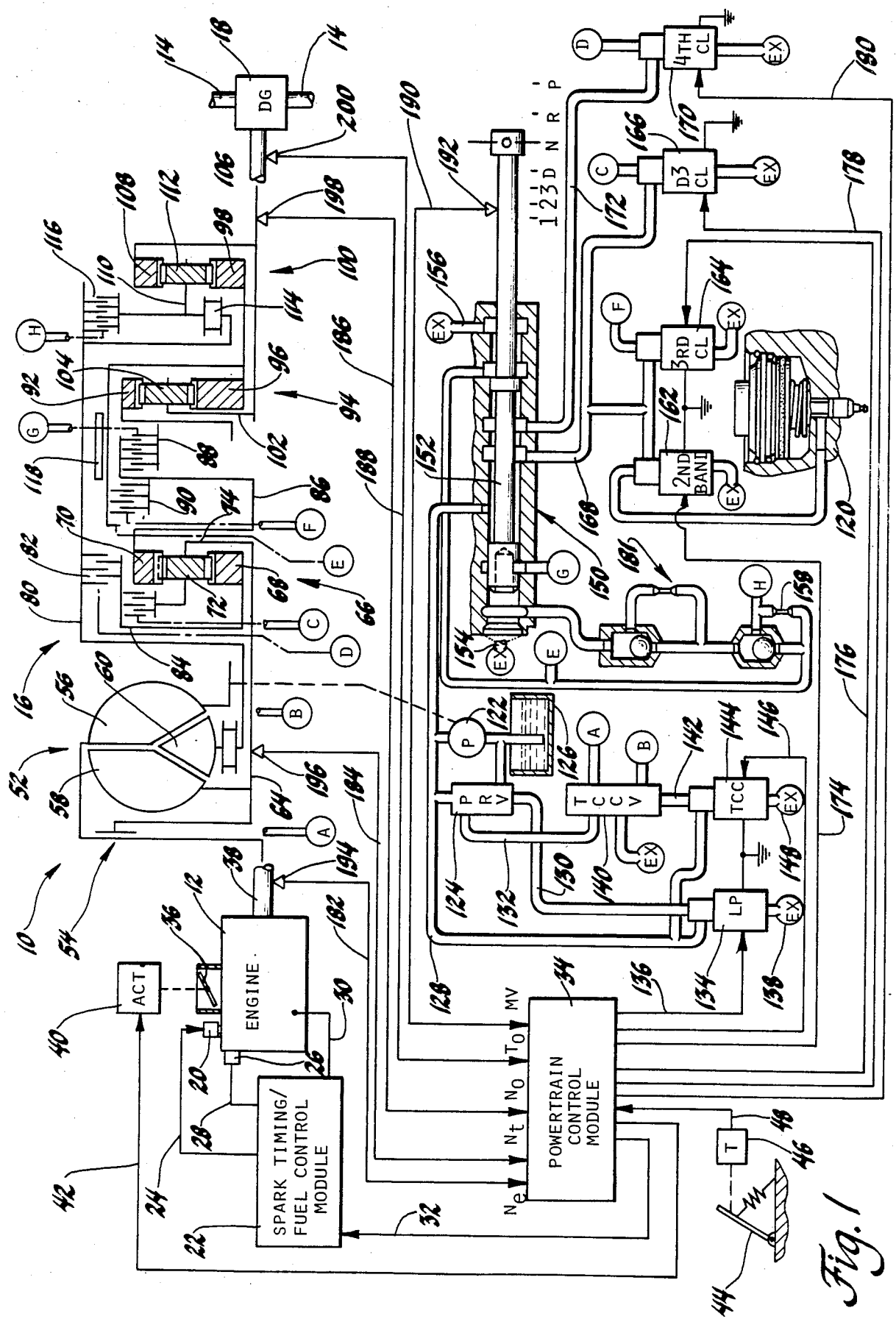
FIG. 1 is a schematic diagram of a vehicle powertrain including a stepped automatic transmission, and a computer-based controller therefor.

FIGS. 6–16 depict flow diagrams representative of computer program instructions executed by the computer-based controller of FIG. 1 in the performance of the control functions of this invention.

Referring now to the drawings, and more particularly to FIG. 1, the reference numeral 10 generally designates a motor vehicle powertrain. The powertrain 10 comprises an internal combustion engine 12 which drives a pair of vehicle prop shafts 14 through a stepped ratio automatic transmission 16 and a conventional differential gearset (DG) 18.

Engine 12 includes a spark timing module 20 which forms part of a conventional spark ignition system. The spark ignition system receives a desired spark timing signal from a spark timing/fuel control module 22 via line 24, and generates the required spark ignition signals in accordance therewith. Fueling information is applied to fuel injection module 26 via line 28. The control module 22 determines the desired spark advance and fuel information in response to a number of engine related operating parameters as indicated by the input line 30, and also according to this invention, in response to a spark retard control signal on line 32 generated by the computer-based powertrain control module 34.

As explained below, the spark retard signals generated by powertrain control module 34 represent a spark timing retard value for use in regulating the engine output torque during shifting. As such, the desired spark signal generated by the control module 22 on line 24 represents the normal spark timing advance, less the retard represented by the control signal on line 32.

Engine 12 also includes a throttle 36 for admitting combustion air and regulating the torque at its output shaft 38. The throttle 36 is positioned by the actuator 40, which in turn, is controlled by the powertrain control module via line 42. In nonshifting operation, the control module 34 regulates the throttle position in accordance with operator demand, as indicated for example, by the position of an operator manipulated accelerator pedal 44. To this end, an accelerator pedal position transducer (T) 46 supplies the control module 34 with a pedal position signal via line 48. However, when a shift is required to satisfy operator demand, the throttle position is regulated in accordance with the shifting requirements as described herein. An example of a suitable control method pertaining to throttle positioning and shift pattern generation is given in the Lockhart U.S. Pat. No. 4,389,910, issued June 28, 1983, and assigned to the assignee of this invention, which patent is incorporated herein by reference.

The transmission 16 includes a conventional torque converter 52 and torque converter clutch 54. The torque converter 52 has an impeller 56 driven by the engine output shaft 38, a turbine 58, and a stator 60. During torque converter operation, line A supplies fluid to the release side of clutch 54. The fluid is returned to a conventional cooler (not shown) via line B. During converter clutch operation, line B supplies fluid to the apply side of clutch 54. Any flow from the converter 52 is exhausted by line A.

The turbine 58 and torque converter clutch 54 are connected to a shaft 64 which is coupled with an overdrive planetary gearset, generally designated by the reference numeral 66. The planetary gearset 66 includes a sun gear 68, a ring gear 70, a plurality of planet gears 72 in meshing engagement with the sun and ring gears 68 and 70, and a planet carrier 74. The carrier 74 is connected to the shaft 64. The sun gear 68 is selectively connectible with the transmission housing 80 through a selectively engageable fluid operated friction brake 82. A selectively engageable fluid clutch 84 connects the planet carrier 74 to the sun gear 68. When the brake 82 is engaged, and the clutch 84 disengaged, the planetary gearset 66 is conditioned for an overdrive ratio; when brake 82 is disengaged, the sun gear 68 free wheels and the transmission 16 is in Neutral. When the brake 82 is disengaged, and the clutch 84 engaged, the sun gear 68 is connected to the planet carrier 74, which locks the planetary gearset 66 for a direct drive.

The ring gear 70 of gearset 66 is connected to a shaft 86 which acts as an input member for a pair of fluid-operated friction clutches 88 and 90. The clutch 88 is connected to a ring gear 92 of planetary gearset 94. The clutch 90 is connected to the sun gear 96 of the planetary gearset 94 and to the sun gear 98 of a planetary gearset 100.

The planetary gearset 94 includes a carrier 102 upon which are mounted a plurality of planet gears 104 in meshing engagement with the sun and ring gears 96 and 92. The carrier 102 is connected to the transmission output shaft 106.

The planetary gearset 100 includes a ring gear 108, a carrier 110, and a plurality of planet gears 112 rotatably mounted on the carrier 110 and in meshing engagement with the sun and ring gears 98 and 108. The ring gear 108 is connected to the output shaft 106, while the carrier 110 may be selectively connected with the transmission housing 80 by a one-way brake 114 or by a fluid-operated friction brake 116. The sun gears 96 and 98 are interconnected and selectively controlled by a fluid-operated friction band brake 118.

Figures 2, 16:
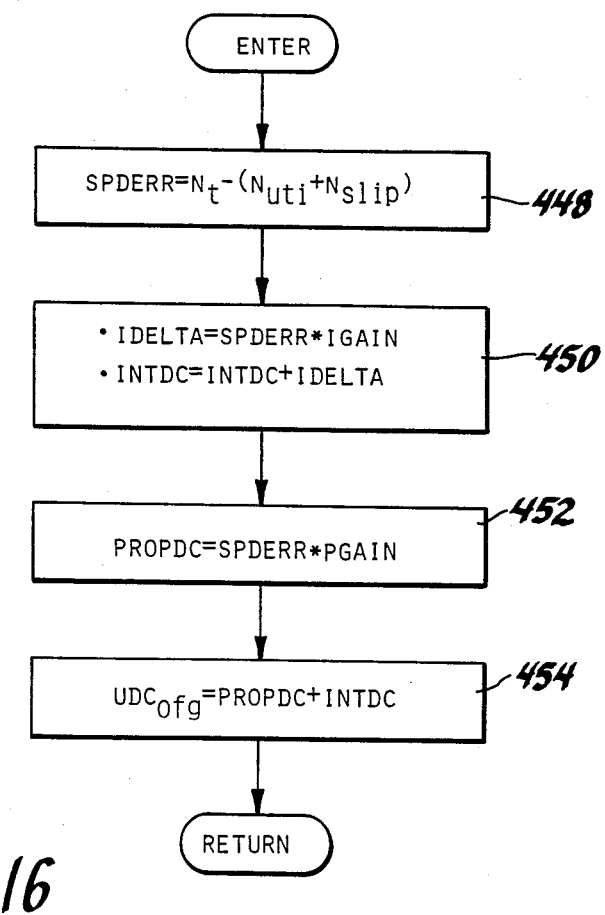
FIG. 2 is a friction element state table for the transmission depicted in FIG. 1.

The fluid-operated devices 82, 84, 88, 90, 116, and 118 are selectively engageable in accordance with the friction element state table of FIG. 2 to provide four forward ratios (1st, 2nd, 3rd, and 4th) and one reverse ratio (Rev). The brake 82 (referred to herein as 4th clutch) is supplied with fluid pressure via line D. The clutch 84 (referred to herein as D3, or Drive 3 clutch) is supplied with fluid pressure via line C. The clutch 88 (referred to herein as the forward clutch) is supplied with fluid pressure via line G. The clutch 90 (referred to herein as 3rd clutch) is supplied with fluid pressure via lines E and F. The pressure is supplied via line E to engage the reverse ratio, and via line F to engage the 3rd and 4th ratios. The brake 116 (referred to herein as 1st/REV clutch) is supplied with fluid pressure via line H. The brake 118 (referred to herein as 2nd band) is engaged by a conventional fluid-operated servo 120.

Three upshifts are possible: 1-2, 2-3, and 3-4. The 1-2 upshift merely requires engagement of the 2nd band 118; the off-going torque establishing device is the one-way brake 114, which releases automatically. The 2-3 upshift requires concurrent release of the 2nd band 118 and engagement of the 3rd clutch 90. The 3-4 upshift requires concurrent release of the D3 clutch 84 and engagement of the 4th clutch 82.

The fluid supply elements for the transmission 16 include a conventional variable displacement pump (P) 122 driven by the impeller 56 of torque converter 52, and a pressure regulator valve (PRV) 124. The pump 122 draws hydraulic fluid from a reservoir 126 and delivers pressurized fluid to the line pressure passage 128. Line 128 is connected to PRV 124, which operates in response to a pilot pressure in line 130 to regulate the fluid pressure therein by returning a variable portion of the fluid to the reservoir 126. In addition, the PRV 124 provides a second regulated fluid pressure in line 132 (hereinafter referred to as converter feed pressure). The pilot pressure in line 130 is obtained from the line pressure solenoid valve 134, which is pulse-width-modulated by the powertrain control module 34 via line 136 to alternately connect line 130 with line pressure in line 128 or with the exhaust line 138. The duty cycle of pulse-width-modulation thereby controls the line pressure in line 128 and the converter feed pressure in line 132.

The converter feed pressure in line 132 is applied to the torque converter control valve (TCCV) 140, which operates in response to a pilot pressure in line 142 to selectively direct converter feed pressure to line A or line B. The pilot pressure in line 142 is obtained from the torque converter clutch solenoid valve 144, which is controlled by the powertrain control module 34 via line 146 to selectively connect line 142 with line pressure in line 128, or the exhaust line 148. The solenoid valve 144 is normally operative to bias the TCCV 140 such that converter feed pressure in line 132 is directed to line A, and line B is exhausted to the cooler. In such state, the clutch 54 is released, and torque converter operation is achieved. However, when it is desired to engage the clutch 54, the solenoid valve 144 is energized to bias the TCCV 140 such that converter feed pressure in line 132 is directed to line B, and line A is exhausted to the cooler.

Line pressure is also supplied to a manual valve 150, the spool 152 of which is adapted to receive linear mechanical input from the operator of the vehicle via a suitable linkage (not shown). The spool 152 is positioned by the operator to select the desired operation of transmission 16 as set forth by the designations P, R, N, D, 3, 2, and 1, which correspond to Park, Reverse, Neutral, Drive, 3rd, 2nd, and 1st, respectively. In turn, the manual valve 150 distributes the line pressure to the various output passages C–H according to the spool position.

In FIG. 1, spool 152 is positioned in relation to the N, or Neutral, indication. In such case, the forward clutch 88 is exhausted via passage G and exhaust line 154, and the reverse clutch 116 is exhausted via passage H and exhaust line 156. Line pressure is supplied to the solenoid valves 162, 164, 166, and 170 via the lines 168 and 172. When the spool 152 is shifted to the D or drive position, line pressure is also supplied to the forward clutch 88 via passage G. The 2nd band solenoid valve 162 is pulse-width-modulated by the powertrain control module 34 via line 174 to control the band apply pressure exerted by the fluid-operated servo 120. The 3rd clutch solenoid valve 164 is pulse-width-modulated by the powertrain control module 34 via line 176 to control the apply pressure of 3rd clutch 90. The D3 clutch solenoid valve 166 is pulse-width-modulated by the powertrain control module 34 via line 178 to control the apply pressure of the D3 clutch 84. The 4th clutch solenoid valve 170 is pulse-width-modulated by the powertrain control module 34 via line 180 to control the apply pressure of the 4th clutch 82. The valving arrangement designated generally by the reference numeral 181 performs 1st/REV timing logic.

The powertrain control module 34 is microcomputer based, and comprises, in addition to a microprocessor, conventional computer elements including memory elements for storing operating instructions and data, A/D converter elements for conditioning various analog inputs, and input/output elements for receiving and sending the various input and output signals. As indicated above, the throttle actuator is controlled via line 42, spark retardation is signaled via line 32, and the various solenoidoperated valves of transmission 16 are controlled via lines 136, 146, 174, 176, 178 and 180.

The inputs of powertrain control module 34 include an accelerator position signal on line 48, an engine speed signal Ne on line 182, a turbine speed signal $N_t$ on line 184, a transmission output speed signal $N_o$ on line 186, a transmission output torque signal $T_o$ on line 188, and a manual valve position signal MV on line 190. The various input signals are obtained using conventional transducer technology. The position signals on lines 48 and 190 are obtained with conventional potentiometers 46 and 192; the speed signals on lines 182–186 are obtained with conventional variable reluctance magnetic pickups 194–198; and the torque signal on line 188 is obtained with a conventional strain gauge and slip ring assembly 200. Obviously other sensor technologies could be used.

In the preferred embodiment, the position of the operator-manipulated accelerator pedal 44 relates to a desired power output, and the engine 12 and transmission 16 are controlled so that the power output of the transmission 16 corresponds thereto. In this type of control, the engine throttle position is regulated in a closed loop manner to achieve the demanded power output. Upshifts are scheduled as soon as the demanded power output can be met in the next higher ratio. Downshifts are scheduled when the demanded power output exceeds the maximum power output available with the present ratio. Such a method of control is set forth in detail in the above-identified U.S. Pat. No. 4,389,910. The present invention is set forth in the context of such a system, and pertains to a method of operation for controlling the engine 12 and transmission 16 during upshifting of the transmission 16 so that the transmission output power is maintained substantially constant. Since the output speed does not change appreciably during the shift, the transmission output torque is maintained substantially constant through the shift. In other shifting—power-on downshifting, for example—this objective may not be attainable, and the shift is carried out using a generally conventional method of control.

FIGS. 3–4 depict various engine and transmission operating parameters on a common time base for a constant throttle transmission upshift. FIG. 3 corresponds to an upshift using a conventional method of control; FIG. 4 corresponds to an upshift using an engine torque reduction as suggested in the prior art. In each Figure, Graph A represents the output torque as seen at sensor 200, Graph B represents a fuel or spark retard parameter, Graph C represents the engine output torque, Graph D represents the engine inertia torque (i.e., the torque required to accelerate the engine to its post-shift speed), and Graph E represents the engine speed.

With either method of control, the upshifts comprise a torque phase which occurs in the interval $t_0$–$t_1$, and an inertia phase which occurs in the interval $t_1$–$t_4$. In the torque phase, the transmitted torque is passed from the off-going clutch (or one-way device) to the on-coming clutch, and the torque ratio $T_o/T_i$ across the transmission is progressively decreased to that defined by the target gear ratio. In the inertia phase, the engine is decelerated to the post-shift speed, and the speed ratio $N_o/N_t$ across the transmission increases to that defined by the target gear ratio.

In the conventionally performed shift of FIG. 3, the transmission output torque decreases below the post-shift level during the torque phase, and increases above the post-shift level during the inertia phase. Since the engine throttle and speed during the torque phase remain relatively constant, the transmission output torque decreases in direct relation to the decrease in torque ratio, as seen in Graph A. The subsequent output torque increase in the inertia phase occurs due to the deceleration of the engine which occurs therein. The torque obtained during the deceleration is referred to as the engine inertia torque, and is depicted in Graph D. When the engine deceleration is completed, the transmission output torque falls to the post-shift level, determined by the engine torque and the torque ratio defined by the target gear ratio. The difference between the pre-shift and post-shift output torques may be lessened by increases in the engine torque which occur due to the engine speed decrease, as seen in Graph C. The variation in output torque is transmitted directly to the vehicle driveline and may adversely impact the drivability of the vehicle as perceived by its occupants.

In the upshift depicted in FIG. 4, the engine torque is reduced in order to reduce the characteristic output torque surge associated with deceleration of the engine during the inertia phase. Since the engine torque is reduced during the inertia phase, the output torque is also reduced as seen in Graph A. The engine torque reduction is achieved by a suitable technique, such as fuel cutoff or ignition timing retardation as indicated in Graph B. However, these techniques do not address the drop in output torque which occurs during the torque phase, and typically result in an abrupt drop in the output torque at time $t_3$ when the engine torque returns to the demanded setting.

In contrast with the above, the present invention achieves substantially constant transmission output torque (and power) during the upshift. The usual drop in output torque during the torque phase is substantially eliminated, and there is no abrupt drop in output torque upon completion of the inertia phase. This effect is achieved, according to this invention, through continuous measurement of the transmission output torque and active control of the engine torque during the shift.

Prior to the torque phase, there is preparatory activity in the throttle and spark timing controls which readies the engine for responsive torque control. The torque phase is initiated through the apply of the on-coming torque establishing device, and the engine torque is progressively increased in relation to the change in torque ratio by a spark and throttle control, thereby to compensate for the usual reduction in output torque.

A change in the speed ratio signifies the initiation of the inertia phase. At such time, the throttle is returned to its demand related setting, and the spark timing is again retarded based on the percent of speed ratio change remaining in the shift. Throughout the inertia phase, the capacity of the on-coming torque establishing device is controlled in a closed loop manner based on the measured output torque in order to maintain the transmission output power substantially constant.

As the change in speed ratio nears completion, the on-coming clutch is fully engaged, and the spark timing has returned to its nominal setting. The combination of positive throttle control, ignition timing modification, and closed-loop clutch pressure control as described above provides an improved quality upshift in which characteristic output torque variations and associated driveline torque disturbances are substantially eliminated. The result is an upshift which is practically imperceptible to the occupants of the vehicle.

FIG. 5 graphically depicts various operating and control parameters on a common time base for a 2-3 upshift carried out according to this invention at constant operator demand. Graph A depicts engine speed. Graph B depicts transmission output torque $T_o$, engine torque $T_e$, inertia torque $T_i$, the positive engine torque component $dT_{thr}$ produced by throttle adjustment, and the negative engine torque component $dT_{ret}$ produced by spark timing retard. Graph C depicts the engagement pressures $P_{90}$ and $P_{118}$ for the on-coming clutch 90 and the off-going band brake 118, and Graph D depicts the resulting clutch and brake torque capacities $T_{90}$ and $T_{118}$. The traces represent a period of vehicle acceleration, and the time $t_0$ signifies the generation of a 2-3 upshift command by the powertrain control module 34. As indicated above, upshift commands are generated, according to the preferred embodiment, whenever it is determined that the demanded power output (as indicated by accelerator pedal position) can be met in a higher gear ratio.

Prior to time $t_0$, the 2nd ratio band brake 118 is fully engaged, defining a predetermined speed ratio $N_o/N_t$ of approximately 0.64:1, and torque ratio $T_o/T_i$ of approximately 1.57:1. At the completion of the shift, the 3rd clutch 90 is fully engaged, defining a predetermined speed ratio $N_o/N_t$ of 1:1, and torque ratio $T_o/T_i$ of 1:1. In torque phase ($t_2$–$t_3$), the torque ratio $T_o/T_i$ decreases from 1.57:1 to 1:1; in the inertia phase ($t_3$–$t_5$), the speed ratio $N_o/N_i$ increases from 0.64:1 to 1:1. The shift is performed with the converter clutch 54 engaged, so that the engine torque $T_e$ is substantially equal to the transmission input torque $T_i$, and the engine speed $N_e$ is substantially equal to the turbine speed $N_t$.

At time $t_0$ when the 2-3 upshift is commanded, the transmission power output $Q_o$ is being regulated in accordance with operator demand (accelerator pedal position). At that point, the output speed $N_o$ and output torque $T_o$ are recorded to define the entry power output $Q_o$ according to the expression:

$$Q_o = T_o \times N_o$$

Thereafter, the engine throttle opening is increased by an amount which would produce an output torque increase equivalent to the amount of reduction which will occur when the change in torque ratio is made, as defined by the predetermined ratios of 2nd and 3rd gears. At the same time, the spark timing is retarded in closed loop manner based on the measured output torque to prevent the increased throttle opening from increasing the engine output torque. Algebraically, the spark timing is retarded such that $$dT_{thr} + dT_{ret} = 0$$

where $dT_{thr}$ is the engine torque change (positive) produced by the throttle increase, and $dT_{ret}$ is the torque change (negative) produced by the spark timing retard. This control is graphically depicted by the corresponding traces of Graph B in the interval $t_0$–$t_1$.

The above control of throttle and spark timing does not affect the engine torque or the transmission output torque. Rather, it serves to prepare the engine 12 for precise and repeatable output torque control. This control is achieved by subsequent modification of the spark timing retard. When the spark timing retard is removed, there is a responsive and predictable increase in engine torque, yielding controllability that cannot be achieved by mere manipulation of the engine throttle.

Although the engine is properly prepared for torque control at time $t_1$, the torque phase of the shift is delayed due to the filling requirements of the on-coming clutch 90. As seen in Graph C, the fill period is commenced at time $t_0$ by initiating the supply of fluid to the clutch 90, the duty cycle of the 3rd clutch solenoid valve 150 being chosen in relation to the output torque recorded at time $t_0$. At time $t_2$ the apply chamber of clutch 90 is filled, and the clutch 90 begins exhibiting torque capacity as seen in Graph D. A fill period occurs in all shifts involving an on-coming clutch or brake, but was not shown in FIGS. 3–4.

Beginning at time $t_0$, the apply pressure of the off-going brake 118 is reduced as seen in Graph C. The reduction is performed in a closed loop manner based on engine speed so as to reduce the torque capacity of the brake 118 to just that required to hold the engine slightly above its entry speed. This serves to prepare the off-going element during the fill period of the clutch 90, and to schedule the transfer of torque from the brake 118 to the clutch 90 as the torque capacity of the clutch 90 builds. If the off-going device is a one-way element such as the one-way brake 114, it automatically releases in relation to the apply of the on-coming device, and no off-going control is required The torque phase begins when the torque capacity $T_{90}$ of the on-coming clutch 90 begins to increase at time $t_2$. In this interval ($t_2$–$t_3$), the torque ratio begins to decrease toward that of the target ratio, and the spark timing retard is removed as seen by the traces $dT_{ret}$ and $T_e$ in Graph B. The spark retard is removed in a closed loop manner as described above to maintain the output torque recorded at the onset of the shift. At the end of the torque phase (time $t_3$), the spark timing retard is completely removed, and the increased engine torque due to the throttle adjustment is sufficient to offset the reduction in torque ratio. Since the torque ratio of the target gear (3rd) is 1:1, the engine torque $T_e$ and the output torque $T_o$ are equal at this time.

A sensed change in the speed ratio across the transmission signals the beginning of the inertia phase at time $t_3$. At such point the off-going brake 118 is fully released, and the spark timing is retarded by a calibrated amount which permits the engine speed to decrease at a relatively rapid rate without increasing the transmission output torque. The amount of retard is determined in relation to the required change in speed ratio, and is removed as the change in speed ratio progresses. At the same time, the engine throttle 36 is returned to the demand setting, resulting in a decrease in engine torque as seen in Graph B. While the engine torque change is depicted as being substantially concurrent with the change in throttle position, it will be recognized that the torque change may be delayed somewhat as indicated by the broken lines 202–204, the amount of such delay being a function of the throttle response of engine 12.

To maintain the output torque at the level recorded at the onset of the shift, the apply pressure of the on-coming clutch 90 is controlled in a closed loop manner based on the measured output torque $T_o$. When the change in speed ratio is complete at time $t_5$, the spark timing retard will have been completely removed, and the on-coming clutch 90 is fully engaged to complete the shift. At such time, the engine torque $T_e$ is once again equal the transmission output torque $T_o$ due to the 1:1 torque ratio of the engaged gear (3rd).

The throttle, spark, and pressure controls described above cooperate to maintain the transmission output torque (and output power) substantially constant during upshifting. Thus, there is substantially no driveline torque variation during the shift, and the output power prior to the shift is substantially equal to the output power after the shift. In the environment of an integral powertrain control, the drivability is considerably enhanced.

Figure 6:
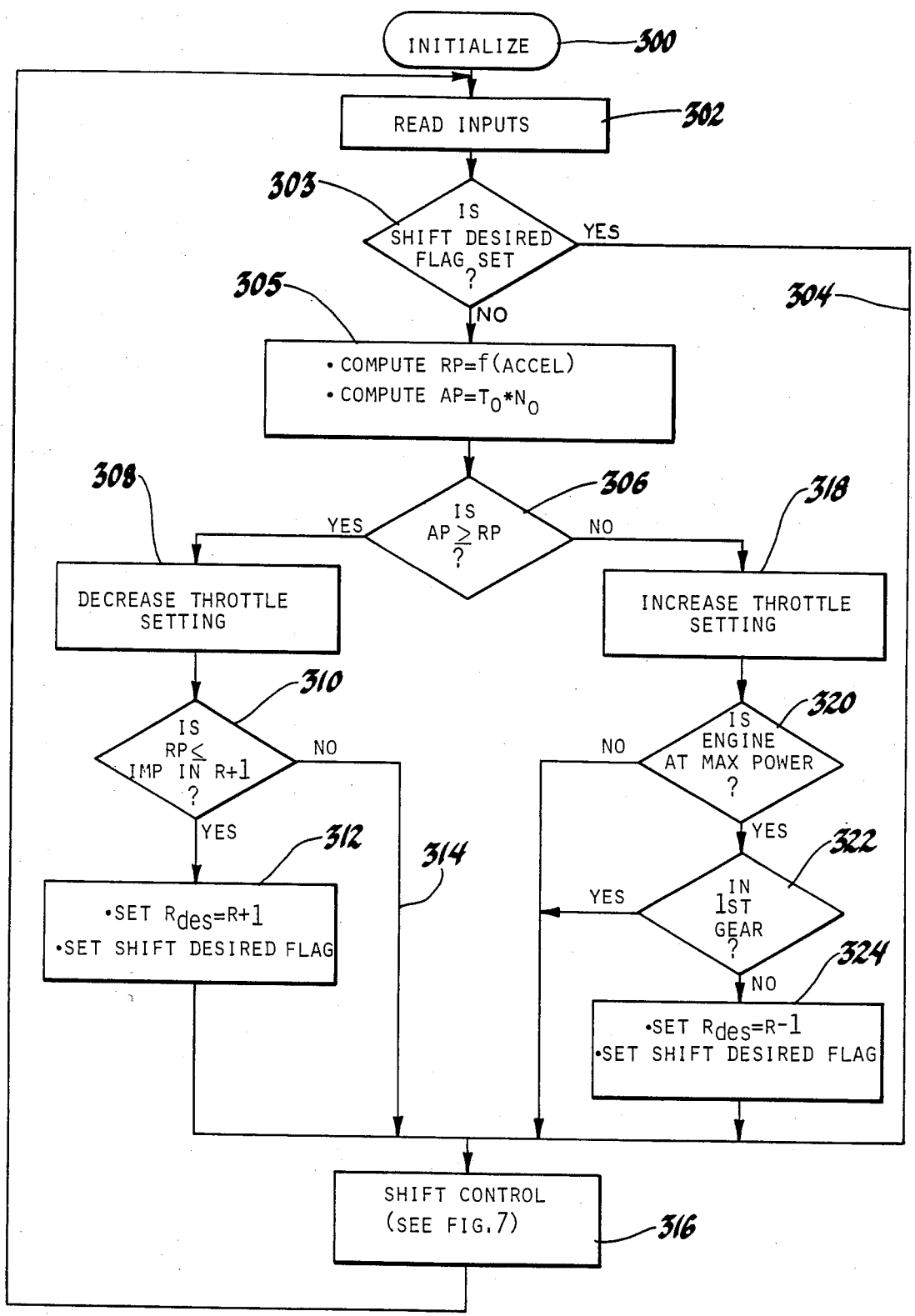

FIGS. 6–16 depict flow diagrams representative of computer program instructions executed by the microcomputer based controller of FIG. 1 in carrying out the control functions of this invention. FIG. 6 is a main loop diagram depicting the basic control steps for an integrated powertrain control system FIGS. 7–16 set forth the shift control of this invention in detail.

Referring now to the flow diagram of FIG. 6, the reference numeral 300 generally designates a series of instructions executed at the initiation of each period of vehicle operation for initializing the various timers, registers and variables of the powertrain control module 34. The remainder of the flow diagram is repeatedly executed during operation of the vehicle, as indicated by the flow lines. First, the instruction block 302 is executed to read the various input values as set forth in FIG. 1. Decision block 303 then determines if a SHIFT DESIRED flag is set. If it is, the normal engine throttle control is overridden by the shift control, as indicated by the flow diagram line 304, and the instruction block 316. If the SHIFT DESIRED flag is not set, normal control of the engine throttle is appropriate, and the blocks 305–324 are executed to position the throttle for bringing the powertrain output power into correspondence with the power level demanded by the operator.

The instruction block 305 is first executed to compute the requested power output (RP) as a function of accelerator pedal position (ACCEL), and to compute the actual power output (AP) according to the product ($T_o \times N_o$).

If the actual power output is greater than the requested power output (as determined at decision block 306), the instruction block 308 is executed to decrease (close) the setting of throttle 36 by a predetermined amount. Then the decision block 310 is executed to determine if the requested power output is less than or equal to the maximum power output (MP) in the next higher gear ratio (R+1) of transmission 16. If so, the requested power output can be provided by the next higher ratio (assuming that 4th gear is not already engaged), and the instruction block 312 is executed to increment the desired ratio $R_{des}$, and to set the SHIFT DESIRED flag. If not, an upshift is not appropriate, and the instruction block 312 is skipped, as indicated by the flow line 314. Thereafter, the instruction block 316 is executed to perform shift control if necessary, such function being set forth in detail in FIGS. 7–16.

If the actual power output is less than the requested power output (as determined at decision block 306), the instruction block 318 is executed to increase (open) the setting of throttle 36 by a predetermined amount. Then the decision block 320 is executed to determine if the engine 12 is operating at or near its maximum power output. This may be determined by referring to the manifold absolute pressure, or another suitable indicator. If so, the requested power output cannot be provided by the current ratio. Providing that transmission is not already in 1st gear, as determined at decision block 322, the instruction block 324 is then executed to decrement the desired ratio $R_{des}$, and to set the SHIFT DESIRED flag. If decision block 320 is answered in the negative, or decision block 322 is answered in the affirmative, a downshift is not appropriate. Thereafter, the instruction block 316 is executed as indicated above to perform shift control as described above.

Figure 7:
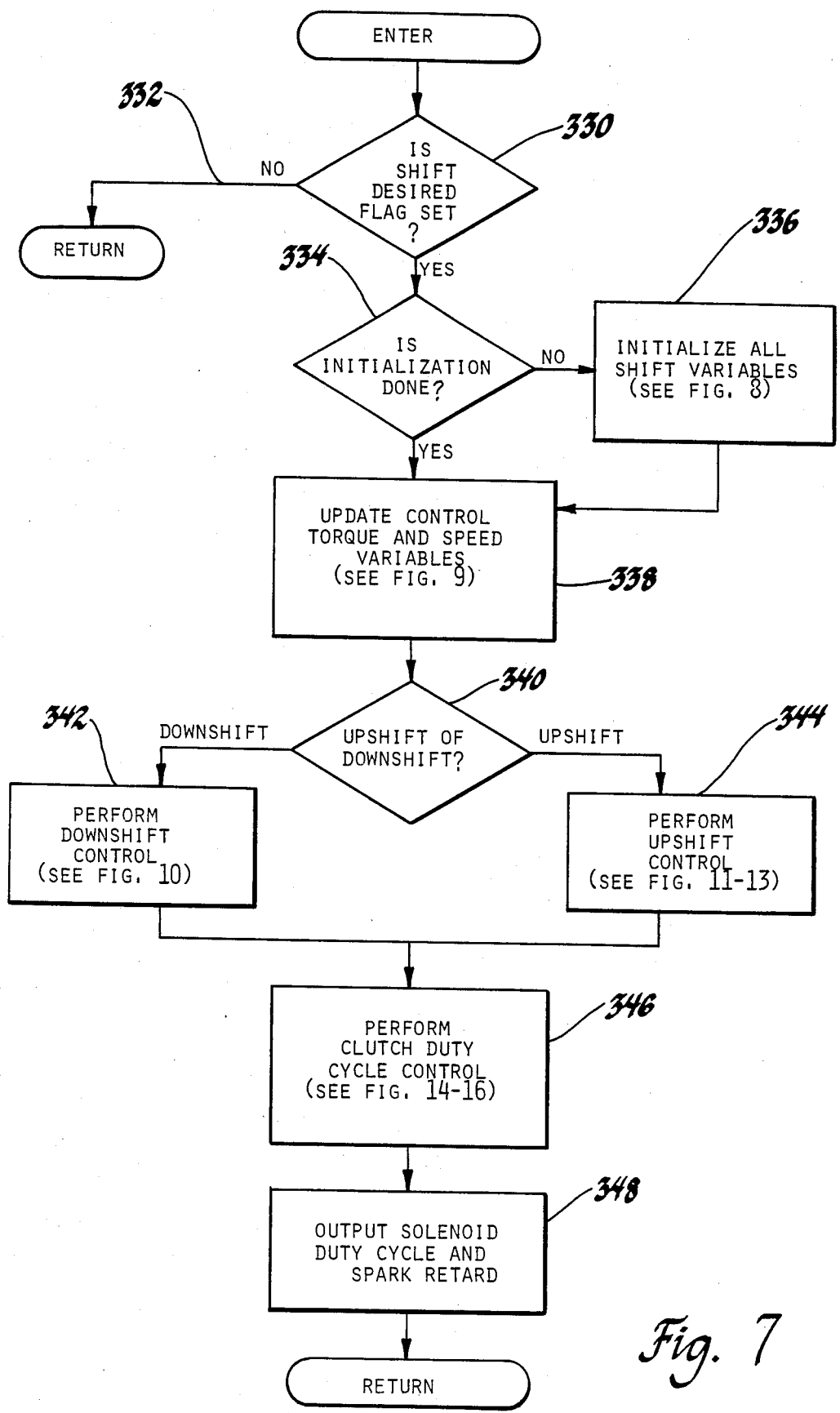

Referring now to the shift control flow diagram of FIG. 7, the decision block 330 is first executed to determine if the SHIFT DESIRED flag is set. If not, the remainder of the routine is skipped, as indicated by the flow diagram line 332. If the flag is set, and the shift has not been initialized, as determined at decision block 334, the instruction block 336 is executed to initialize all shift variables. This function is set forth in detail in the flow diagram of FIG. 8, as indicated. Following shift initialization, the instruction block 338 is executed to update the control torque and speed variables for the shift. This function is set forth in detail in the flow diagram of FIG. 9, as indicated.

If the desired shift is a downshift (as determined at decision block 340), the instruction block 342 is then executed to perform the downshift control. This function is set forth generally in FIG. 10, as indicated. If the desired shift is an upshift, the instruction block 344 is executed to perform the upshift control. This function is set forth in detail in FIGS. 11-13, as indicated.

Following the shift control, the instruction blocks 346 and 348 are executed to determine the energization duty cycles for the active clutch elements, and to output duty cycle and spark timing retard control signals. The duty cycle determination is set forth in detail in FIGS. 14-16, as indicated.

Figure 8:
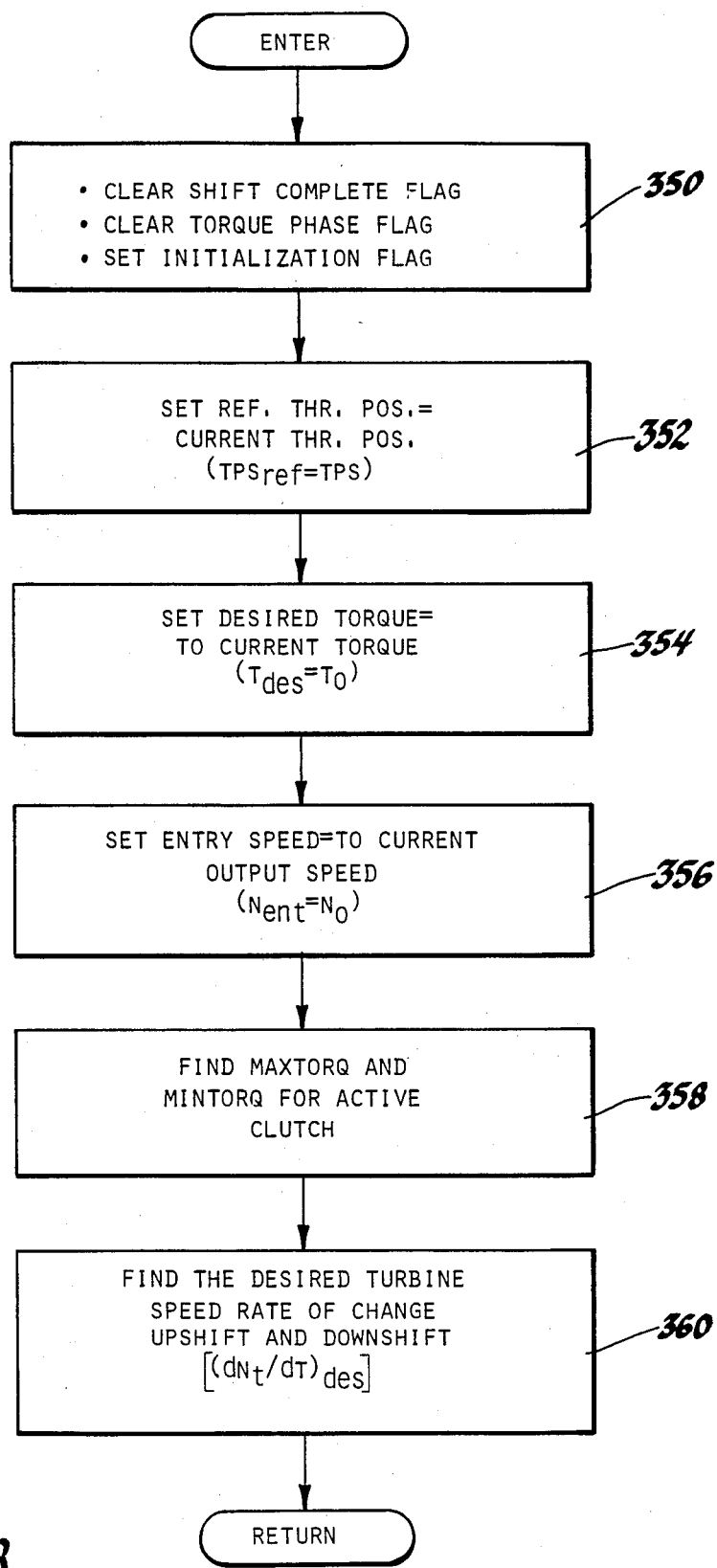

Referring now to the shift variable initialization flow diagram of FIG. 8, the instruction blocks 350-360 are executed in sequence as indicated. Instruction block 350 clears the SHIFT COMPLETE and TORQUE PHASE flags, and sets the INITIALIZATION flag. Instruction block 352 sets a reference throttle position term $TPS_{ref}$ equal to the current throttle position (TPS). Instruction block 354 sets the desired torque ($T_{des}$) equal to the current value of measured torque ($T_o$). Instruction block 356 sets the entry output speed $N_{ent}$ equal to the current value of measured output speed $N_o$. Instruction block 358 retrieves previously stored information relating to the maximum and minimum control torques MAXTORQ and MINTORQ. Instruction block 360 retrieves previously stored information relating to the desired rate of change of turbine speed, $(dN_t/dt)_{des}$, for the inertia phase of the shift.

Figure 9:
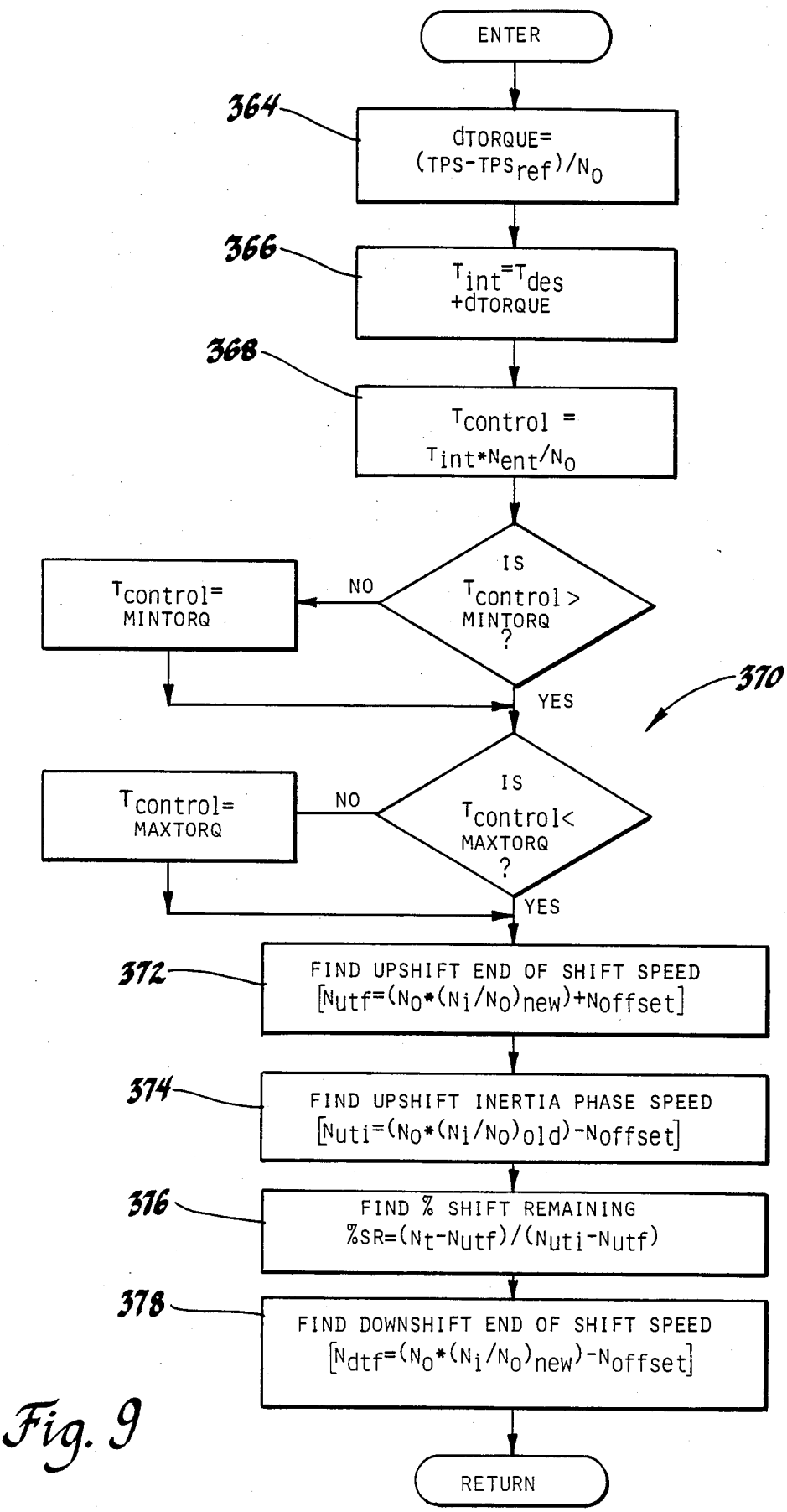

Referring now to the flow diagram of FIG. 9, the instruction blocks 364-368 update a torque control variable $T_{control}$ for changes in the accelerator pedal position and the output speed $N_o$. The required torque change dTORQUE due to accelerator pedal movement is determined at instruction block 364 as a function of the pedal movement and the output speed $N_o$ according to the expression:

$$dTORQUE = (TPS - TPS_{ref})/N_o$$

Instruction block 366 then determines an intermediate torque term $T_{int}$ according to the sum of the desired torque $T_{des}$ (determined at instruction block 354 of FIG. 8) and the torque change term dTORQUE. The term dTORQUE may be positive or negative, depending on the direction of accelerator pedal adjustment. At instruction block 368, the intermediate torque term $T_{int}$ is adjusted for changes in output speed $N_o$ by multiplying it by the ratio $(N_{ent}/N_o)$, and then set equal to the torque control term $T_{control}$. This serves to increase the torque control term $T_{control}$ when the output speed $N_o$ below the entry speed $N_{ent}$, and to decrease the torque control term $T_{control}$ when the output speed $N_o$ rises above the entry speed $N_{ent}$.

The blocks designated generally by the reference numeral 370 serve to limit the value of the torque control term $T_{control}$ in accordance with the minimum and maximum control torque values determined at instruction block 358 of FIG. 8.

The instruction blocks 372-376 are then executed to compute various parameters for determining an upshift sequence. Instruction block 372 determines the final, or end of shift, turbine speed $N_{utf}$ according to the expression:

$$N_{utf} = (N_o \times (N_i/N_o)_{new}) + N_{offset}$$

where $(N_i/N_o)_{new}$ is the speed ratio defined by the desired or target gear. $N_{offset}$ provides some hysteresis to compensate for variations in speed measurement. Instruction block 374 determines the initial inertia phase, or end of torque phase, turbine speed $N_{uti}$ according to the expression:

$$N_{uti} = (N_o \times (N_i/N_o)_{old}) - N_{offset}$$

where the term $(N_i/N_o)_{old}$ is the speed ratio defined by the current or old gear. Finally, the instruction block 376 determines the percent of speed ratio change remaining % SR according to the expression:

$$\% SR = (N_t - N_{utf})/(N_{uti} - N_{utf})$$

The percentage of upshift speed ratio change remaining in the case of an upshift is used for removing the inertia phase spark retard.

The instruction block 378 determines the final, or end of shift speed $N_{dtf}$ in the case of a downshift according to the expression:

$$N_{dtf} = (N_o \times (N_i/N_o)_{new}) - N_{offset}$$

Figure 10:
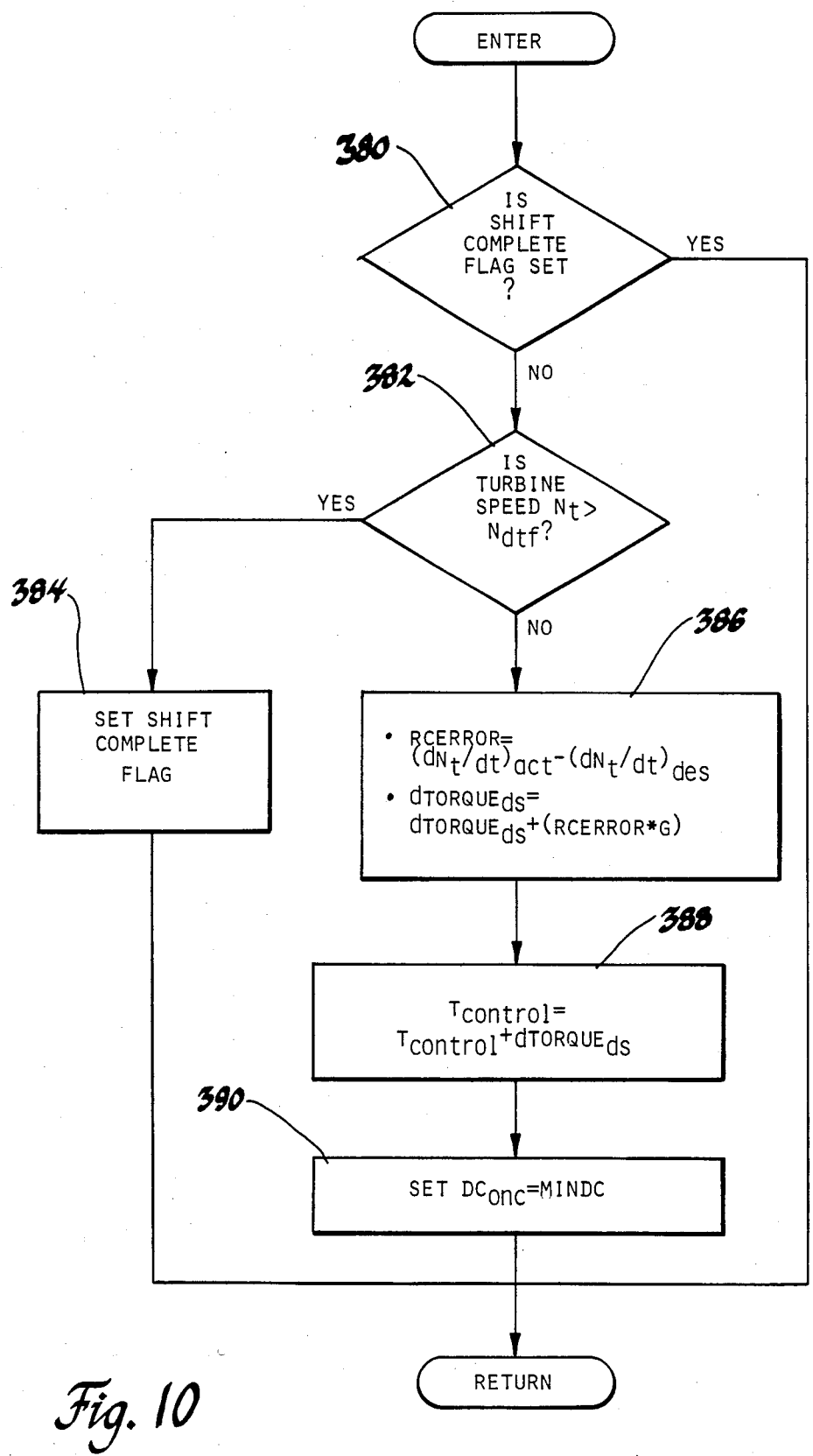

Referring now to the downshift control flow diagram of FIG. 10, the instruction block 380 is first executed to determine if the SHIFT COMPLETE flag is set. As in the upshift control flow diagrams described below in reference to FIGS. 11-13, the SHIFT COMPLETE flag is set to indicate when the shift is complete and reset to indicate that the shift is in progress. If the SHIFT COMPLETE flag is set, the remainder of the routine is skipped, as indicated. If the SHIFT COMPLETE flag is not set, the decision block 382 is executed to test for end of shift by comparing the turbine speed $N_t$ with the downshift final speed $N_{dtf}$ determined at instruction block 378 of FIG. 9. If $N_t$ exceeds $N_{dtf}$, the shift is complete, and instruction block 384 is executed to set the SHIFT COMPLETE flag.

If a downshift is in progress, as determined by the decision blocks 380-382, the instruction blocks 386-388 are executed to determine a new value of the desired torque term ($T_{des}$). First, the desired rate of change in turbine speed $(dN_t/dt)_{des}$ (from instruction block 360 of FIG. 8) is compared with the actual rate of change in turbine speed $(dN_t/dt)_{act}$ to determine the turbine rate of change error, RCERROR. A downshift torque change term $dTORQUE_{ds}$ is then computed according to the expression:

$$dTORQUE_{ds} = dTORQUE_{ds} + (RCERROR \times G)$$

where G is a fixed gain term. The control torque term ($T_{control}$) from instruction block 368 of FIG. 9 is then modified as a function of the downshift torque change term $dTORQUE_{ds}$ according to the expression:

$$T_{control} = T_{control} + dTORQUE_{ds}$$

As a result, $T_{control}$ is increased or decreased in an integral fashion in the course of a downshift to cause the actual rate of change in turbine speed to correspond with the desired rate. When the actual rate is less than the desired rate, the term $T_{control}$ is reduced to permit the engine to further accelerate the turbine. When the actual rate is greater than the desired rate, the term $T_{control}$ is increased to reduce the actual rate.

The instruction block 390 sets the duty cycle of the on-coming clutch or brake $DC_{onc}$ at a minimum duty cycle MINDC so that the on-coming device is prepared to transmit torque when the off-going device is released.

Figure 11:
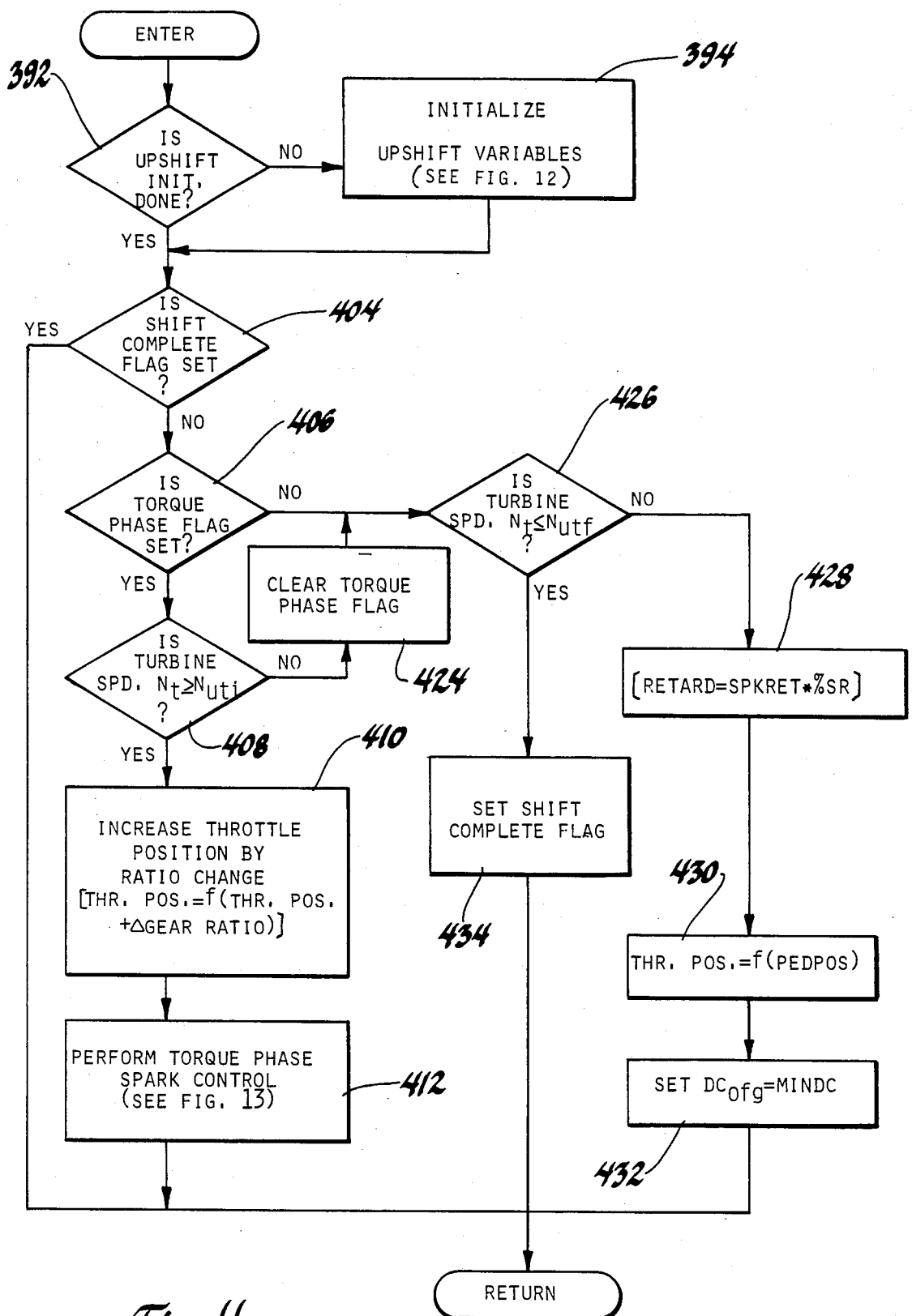
Figure 12:
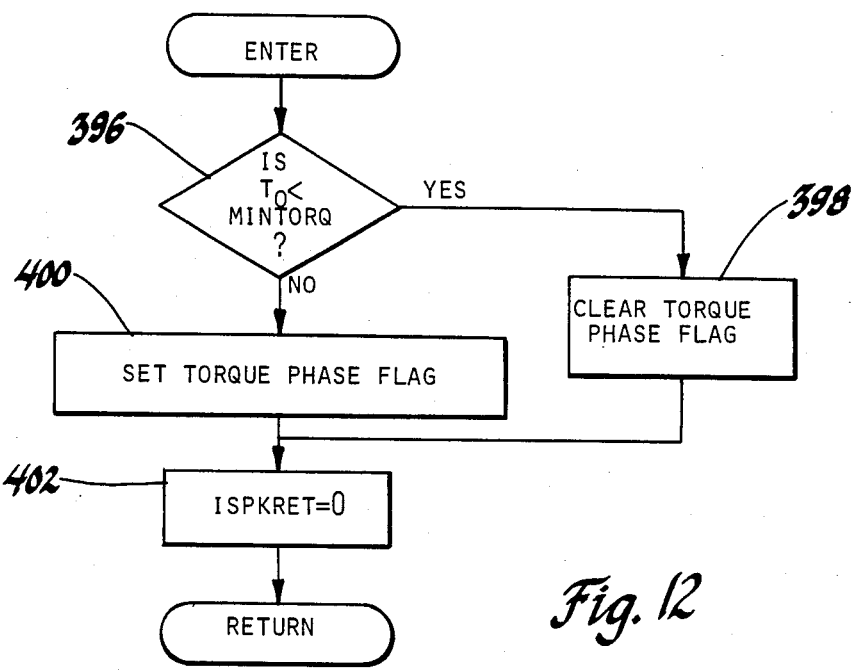
Figure 13:
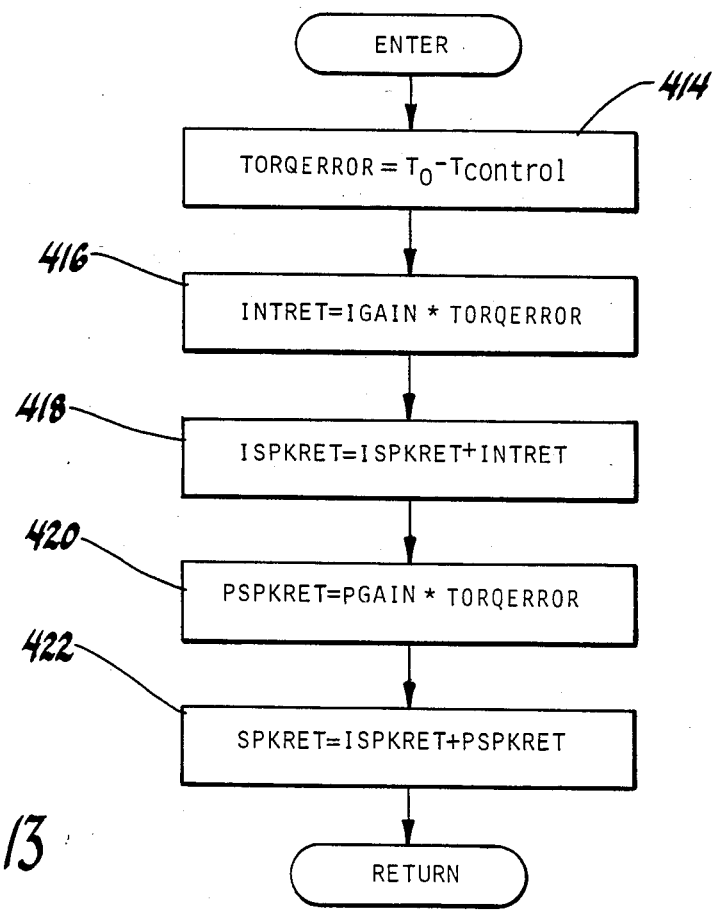

Referring now to the upshift control flow diagram of FIGS. 11-13, the blocks 392 and 394 are first executed to initialize certain upshift variables at the onset of an upshift Such initialization is set forth in detail in FIG. 12, and comprises the blocks 396-402. The decision block 396 determines if the measured output torque $T_o$ is less than a reference minimum torque, MINTORQ. If so, the shift is a coast-type upshift having no torque phase as such, and the instruction block 398 is executed to clear the TORQUE PHASE flag. If $T_o$ is at least as great as MINTORQ, the instruction block 400 is executed to set the TORQUE PHASE flag. The instruction block 402 serves to initialize the integral spark retard term ISPKRET to zero.

Following upshift initialization, the decision block 404 of FIG. 11 is executed to determine if the SHIFT COMPLETE flag is set. If so, the remainder of the routine is skipped, as indicated. If not, the decision block 406 is executed to determine if the TORQUE PHASE flag is set. If the TORQUE PHASE flag is set, and the turbine speed $N_t$ is at least as great as the upshift torque phase speed $N_{uti}$ (as determined at decision block 408), the torque phase of the shift is still active. In such case, the instruction blocks 410 and 412 are executed to determine the throttle and spark retard adjustments to avoid the drop in output torque due to the change in torque ratio.

The instruction block 410 increases the throttle position by an amount which would produce an output torque increase equivalent to the reduction in torque ratio associated with the shift. The instruction block 412 relates to the spark timing control, and is set forth in detail in FIG. 13, as indicated.

Referring to FIG. 13, the spark timing control instruction blocks 414-422 are executed in order as indicated. Instruction block 414 computes the output torque error TORQERROR according to the difference between the measured output torque $T_o$ and the torque control term $T_{control}$. The instruction blocks 416-422 compute a spark retard term, SPKRET, as the sum of integral and proportional terms, ISPKRET and PSPKRET. The integrator INTRET is computed at instruction block 416 by applying an integral gain term IGAIN to TORQERROR, and the integral term ISPKRET is computed at instruction block 418. The proportional term PSPKRET is computed at instruction block 420 by applying a proportional gain term PGAIN to TORQERROR. The full spark retard term SPKRET is computed at instruction block 422.

When the turbine speed $N_t$ falls below the upshift initial turbine speed $N_{uti}$, the shift has entered the inertia phase, and the instruction block 424 of FIG. 11 is executed to clear the torque phase flag. So long as the turbine speed is greater than the upshift final turbine speed $N_{utf}$, as determined at decision block 426, the instruction blocks 428-432 are executed to (1) adjust the spark retard as a function of the percent of speed ratio remaining, (2) to control the throttle position in accordance with operator demand, and (3) to reduce the duty cycle of the off-going clutch $DC_{ofg}$ to a minimum value, MINDC. When the turbine speed $N_t$ is less than or equal to the upshift final turbine speed $N_{utf}$, the inertia phase is complete and the instruction block 434 is executed to set the SHIFT COMPLETE flag.

Figure 14:
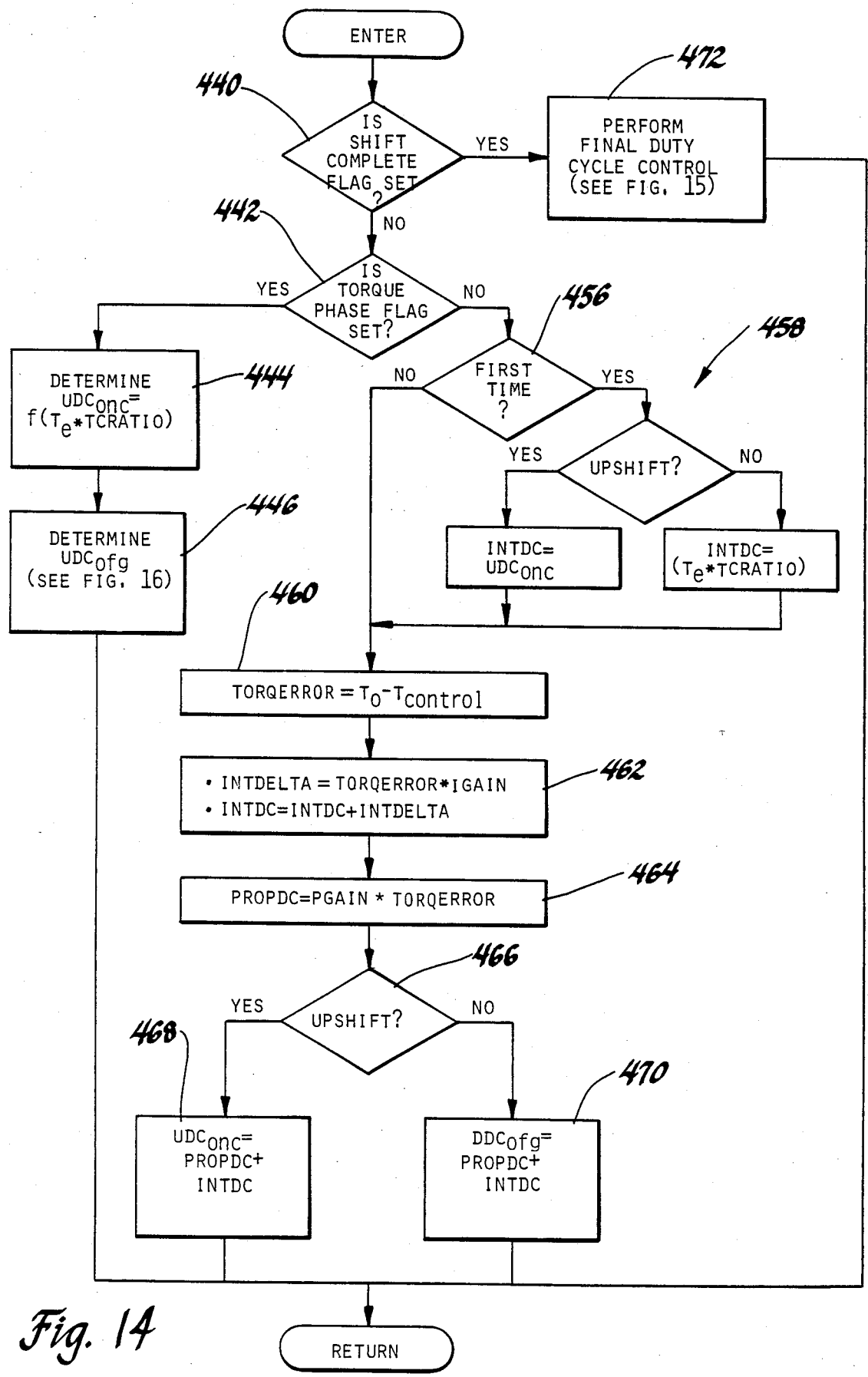
Figure 15:
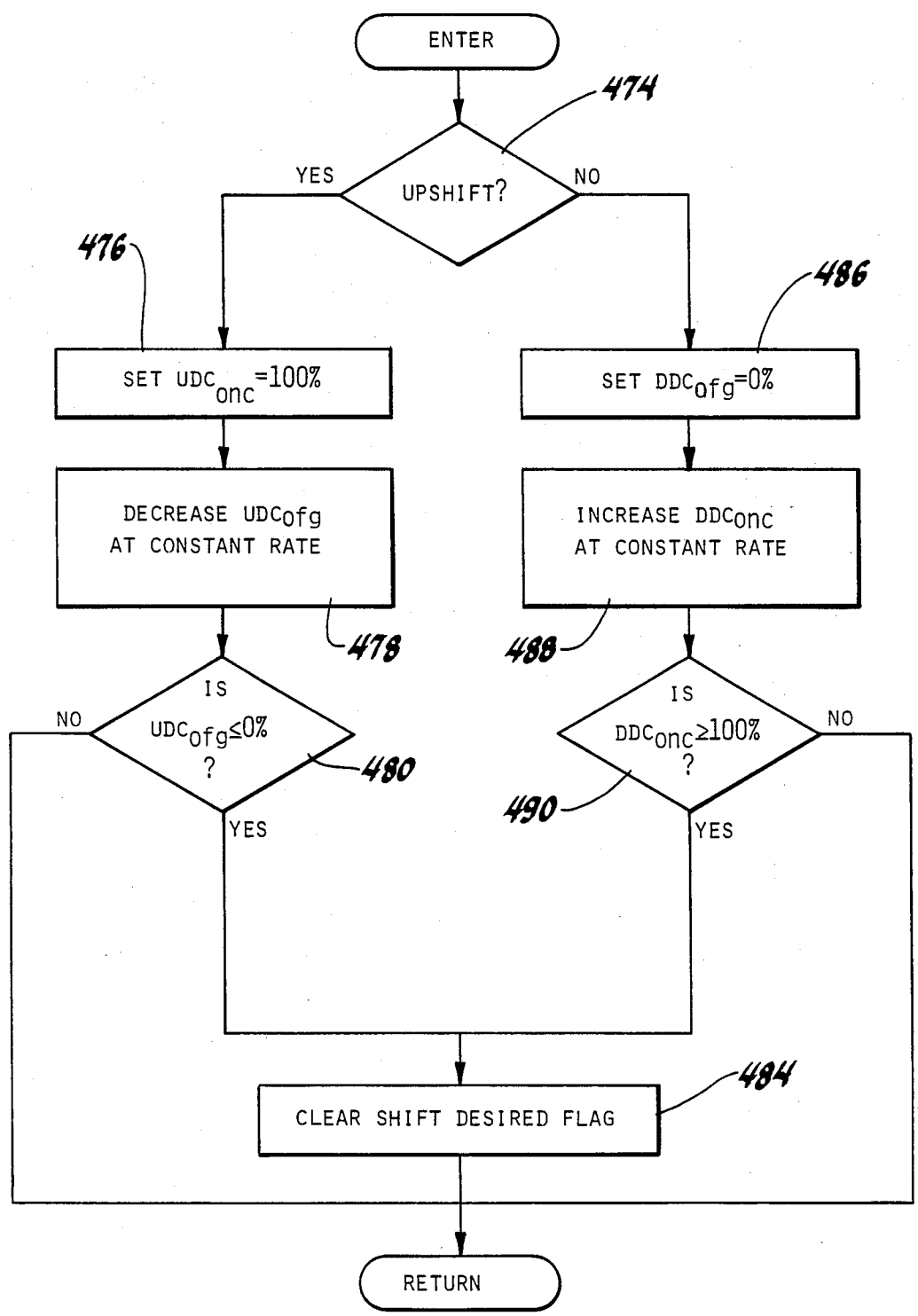

Referring now to the clutch duty cycle control flow diagram of FIGS. 14-16, the decision block 440 is first executed to determine if the SHIFT COMPLETE flag is set. If not, the shift is still in progress If the torque phase is still active, as determined at decision block 442, the shift is an upshift, and the instruction block 444 is executed to determine the upshift duty cycle of the on-coming clutch $UDC_{onc}$. The duty cycle is determined as a function of the engine torque $T_e$ at the onset of the shift and the torque ratio TCRATIO of torque converter 52. The duty cycle generates apply pressure for filling the on-coming clutch or brake and providing sufficient torque capacity to complete the torque phase of the shift. In addition, the instruction block 446 is executed to determine the off-going duty cycle $UDC_{ofg}$, such function being set forth in detail in the flow diagram of FIG. 16 as indicated.

Referring to FIG. 16, the instruction blocks 448-454 are executed in order as shown. Essentially, the off-going duty cycle $UDC_{ofg}$ is determined as a proportional and integral function of a turbine speed error term SPDERR. The object is to reduce the torque capacity of the off-going clutch as quickly as possible while preventing the engine speed from increasing by more than the predetermined amount, $N_{slip}$. As set forth at instruction block 448, the term SPDERR is determined according to the expression:

$$SPDERR = N_t - (N_{uti} + N_{slip})$$

The integrator IDELTA is determined according to the product of SPDERR and an integral gain term IGAIN, and the integral duty cycle term INTDC is determined according to the expression:

$$INTDC = INTDC + IDELTA$$

The proportional duty cycle term PROPDC is determined according to the product of SPDERR and a proportional gain term PGAIN. The proportional and integral duty cycle terms PROPDC and INTDC are summed at instruction block 454 to form the off-going duty cycle term $UDC_{ofg}$.

If decision block 442 of FIG. 14 determines that the TORQUE PHASE flag is not set, the shift has entered the inertia phase. The active clutch duty cycles $UDC_{onc}$ and $DDC_{ofg}$ for upshifts and downshifts are determined as an integral and proportional function of the difference TORQERROR between the output torque $T_o$ and the control torque $T_{control}$.

At the onset of the inertia phase, as detected by the decision block 456, the blocks designated generally by the reference numeral 458 are executed to initialize the integral term INTDC. In the case of an upshift, the INTDC is initialized at the current duty cycle determined at instruction block 444. In the case of a downshift, INTDC is initialized as a function of the engine torque $T_e$ and the torque ratio TCRATIO of torque converter 52.

The instruction blocks 460-464 compute the term TORQERROR, and the integral and proportional terms INTDC and PROPDC The integrator term INTDELTA is determined according to the product of TORQERROR and an integral gain term IGAIN. The integral duty cycle term INTDC is computed according to the expression:

INTDC = INTDC + INTDELTA

The proportional term PROPDC is determined according to the product of TORQERROR and a proportional gain term PGAIN.

If the shift is an upshift, as determined at decision block 466, the active upshift duty cycle term $UDC_{onc}$ computed as the sum of the proportional and integral duty cycle terms PROPDC and INTDC, as indicated at instruction block 468. If the shift is a downshift, the active downshift duty cycle term $DDC_{ofg}$ is computed as the sum of the proportional and integral duty cycle terms PROPDC and INTDC, as indicated at instruction block 470.

When the upshift or downshift is complete, the SHIFT COMPLETE flag is set, and the final duty cycle control flow diagram of FIG. 15 is executed, as indicated at the instruction block 472. Referring to FIG. 15, the decision block 474 is first executed to determine if the shift is an upshift. If so, the instruction blocks 476 and 478 are executed to set the duty cycle $UDC_{onc}$ at 100% to fully engage the on-coming clutch, and to reduce the duty cycle $UDC_{ofg}$ at a predetermined rate to progressively release the off-going clutch. When the duty cycle $UDC_{ofg}$ reaches 0%, the SHIFT DESIRED flag is cleared, as indicated by the blocks 480 and 484.

In the case of a downshift, the instruction blocks 486 and 488 are executed to set the duty cycle $DDC_{ofg}$ at zero percent to fully release the off-going clutch, and to increase the duty cycle $DDC_{onc}$ at a predetermined rate to progressively apply the on-coming clutch. When the duty cycle $DDC_{onc}$ reaches 100%, the SHIFT DESIRED flag is cleared, as indicated by the blocks 490 and 484.

In the manner described above, the engine throttle and spark timing, and the transmission clutch apply pressures are actively controlled during upshifting to maintain the powertrain output torque and power substantially constant. The control is premised on principle that the operator manipulated accelerator pedal defines a desired output power for the powertrain—the control of this invention maintains the output power at the desired level throughout upshifts of the transmission so that the shifting is essentially imperceptible to the occupants of the vehicle.

This invention has been described in reference to the illustrated embodiment, and it is anticipated that various modifications thereto will occur to those skilled in the art. In this regard, control systems and methods incorporating such modifications may fall within the scope of this invention, which is defined by the amended claims.

The embodiments of the invention in which an exclusive property or privilege is claimed are defined as follows:

1. In a motor vehicle powertrain including a throttled spark ignition internal combustion engine adapted to drive a powertrain output shaft through a shiftable ratio transmission having first and second elements defining first and second torque and speed ratios between the engine and the powertrain output shaft, the second torque ratio providing less torque advantage than the first torque ratio, and the second speed ratio providing greater speed advantage than the first speed ratio, and a torque transmitting device associated with each of said first and second elements selectively operable to activate the respective speed and torque ratios, and a controller normally effective to set the timing of the engine spark ignition in accordance with engine operating parameters, and to set the position of the engine throttle in accordance with a measured powertrain parameter so as to maintain the powertrain power output at a level selected by the motor vehicle operator, a method of operation which maintains the powertrain power output at the selected level during shifting from said first speed and torque ratios to said second speed and torque ratios, the method comprising the steps of:

detecting an operating condition in which the first speed and torque ratios of the transmission are activated and in which the engine would be capable of driving the powertrain output shaft at the power level selected by the operator with the second torque ratio activated, and in response to such detection:

increasing the position of the engine throttle to produce an engine torque increase in relation to the decrease in torque advantage between the first and second torque ratios, and concurrently retarding the timing of the engine spark ignition to counter the increase in torque due to the increase in throttle position, thereby to prepare the engine for spark timing control of its output torque while maintaining the powertrain output power substantially at the level selected by the operator;

progressively increasing the torque capacity of the torque establishing device associated with said second elements, and decreasing the torque capacity of the torque establishing device associated with said first elements;

advancing the timing of the engine spark ignition in accordance with a measured powertrain parameter to maintain the powertrain output power substantially at the level selected by the operator, whereby the engine torque increases in the amount necessary to counter the decreased torque advantage of said second torque ratio; and returning the engine throttle position to the normally effective setting and controlling the torque capacity of the torque transmitting device associated with said second elements in accordance with a measured powertrain parameter when the engine speed changes in response to increased torque capacity of the torque transmitting device associated with the second elements, so as to maintain the powertrain output power at the level selected by the operator while the speed ratio of the transmission changes from the first speed ratio to the second speed ratio.

2. A method of operation as set forth in claim 1, including the steps of:

retarding the timing of the engine spark ignition in relation to the increase in speed advantage of said second speed ratio relative to said first speed ratio when the transmission input speed changes in response to the transmission of torque by the torque transmitting device associated with said second elements, and thereafter, progressively advancing the timing of the engine spark ignition in relation to the actual increase in transmission speed ratio so that when the shift in speed ratio is complete, the timing of the engine spark ignition is returned to the normally effective setting.

3. In a motor vehicle powertrain including a throttled spark ignition internal combustion engine adapted to drive a powertrain output shaft through a shiftable ratio transmission having first and second elements defining first and second torque and speed ratios between the engine and the powertrain output shaft, the second torque ratio providing less torque advantage than the first torque ratio, and the second speed ratio providing greater speed advantage than the first speed ratio, and a torque transmitting device associated with each of said first and second elements selectively operable to activate the respective speed and torque ratios, and a controller normally effective to set the timing of the engine spark ignition in accordance with engine operating parameters, and to set the position of the engine throttle in accordance with a measured powertrain parameter so as to maintain the powertrain power output at a level selected by the motor vehicle operator, a system for maintaining the powertrain power output at the selected level during shifting of the transmission from said first speed and torque ratios to said second speed and torque ratios, the system comprising:

means including control means for detecting an operating condition in which the first speed and torque ratios of the transmission have been activated and in which the engine would be capable of driving the powertrain output shaft at the power level selected by the operator with the second torque ratio activated, the control means being effective in response to such detection to initiate activation of the torque transmitting device associated with the second elements and deactivation of the torque transmitting device associated with the first elements;

the control means being further effective in a preparatory phase wherein the torque transmitting device associated with the second elements is not yet ready for engine torque transmission, for (1) increasing the position of the engine throttle to produce an engine torque increase in relation to the reduction in torque advantage between the first and second torque ratios, and (2) retarding the timing of the engine spark ignition to counter the increase in torque due to the increase in throttle position, thereby preparing the engine for spark timing control of its output torque while maintaining the powertrain output power substantially at the level selected by the operator;

the control means being further effective in a torque phase wherein the torque transmitting device associated with the second elements begins transmitting engine torque without decreasing the engine speed, and the torque ratio of the transmission decreases from the first torque ratio to the second torque ratio, for advancing the timing of the engine spark ignition in accordance with a measured powertrain parameter to maintain the powertrain output power substantially at the level selected by the operator, whereby the engine torque increases in the amount necessary to counter the decreased torque advantage of said second torque ratio; and the control means being further effective in an inertia phase wherein the engine speed decreases in response to the transmission of engine torque by the torque transmitting device associated with the second elements, and the speed ratio of the transmission increases from the first speed ratio to the second speed ratio, for (1) returning the engine throttle position to the normally effective setting, (2) controlling the torque capacity of the torque transmitting device associated with said second elements in accordance with a measure of the powertrain output power to maintain the powertrain output power at the level selected by the operator 4. A system as set forth in claim 3, where the control means is further effective in the inertia phase for retarding the timing of the engine spark ignition in relation to the increase in speed advantage of said second speed ratio relative to said first speed ratio, and thereafter, progressively advancing the timing of the engine spark ignition in relation to the actual increase in transmission speed ratio so that when the shift is complete, the timing of the engine spark ignition is returned to the normally effective setting.

5. The system set forth in claim 3, wherein the retard and advance of the engine spark ignition timing is controlled closed loop based on a measure of the powertrain output power so as to maintain such output power at the level selected by the operator of the vehicle.

* * * * *